(12) United States Patent
Ko

(10) Patent No.: US 6,381,456 B1
(45) Date of Patent: Apr. 30, 2002

(54) METHOD FOR MANAGING SUBSCRIBER LOCATION INFORMATION IN MOBILE COMMUNICATIONS SYSTEM

(75) Inventor: Hong Gi Ko, Kunpo-Si (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/224,267

(22) Filed: Dec. 31, 1998

(30) Foreign Application Priority Data

Dec. 31, 1997 (KR) .............................. 97-82195

(51) Int. Cl.[7] ................................ H04Q 7/20
(52) U.S. Cl. ................. 455/435; 455/456; 455/433; 455/411
(58) Field of Search ................. 455/435, 410, 455/432, 433, 406, 422, 561, 456, 411, 457; 380/247

(56) References Cited

U.S. PATENT DOCUMENTS

| | | | | |
|---|---|---|---|---|
| 4,876,738 A | * | 10/1989 | Selby ........................ | 455/435 |
| 5,212,822 A | * | 5/1993 | Fukumine et al. .......... | 455/435 |
| 5,247,698 A | * | 9/1993 | Sawyer et al. .............. | 455/33.1 |
| 5,450,582 A | * | 9/1995 | Nakajima et al. ............ | 707/10 |
| 5,564,068 A | * | 10/1996 | Nguyen ...................... | 455/33.1 |
| 5,603,081 A | * | 2/1997 | Raith et al. ................. | 455/33.1 |
| 5,642,398 A | * | 6/1997 | Tiedemann, Jr. et al. ..... | 379/57 |
| 5,666,652 A | * | 9/1997 | Lin et al. ..................... | 455/435 |
| 5,732,350 A | * | 3/1998 | Marko et al. ................ | 455/435 |
| 5,734,977 A | * | 3/1998 | Sanmugam .................. | 455/410 |
| 5,842,127 A | * | 11/1998 | Pashtan et al. .............. | 455/435 |
| 5,850,445 A | * | 12/1998 | Chan et al. .................. | 380/247 |
| 5,884,172 A | * | 3/1999 | Sawyer ....................... | 455/435 |
| 5,898,923 A | * | 4/1999 | Gaasvik et al. ............. | 455/434 |
| 5,920,816 A | * | 7/1999 | Khan et al. .................. | 455/435 |
| 5,953,652 A | * | 9/1999 | Amin et al. ................. | 455/410 |
| 6,078,811 A | * | 6/2000 | Lin et al. ..................... | 455/433 |
| 6,108,540 A | * | 8/2000 | Sonti et al. .................. | 455/433 |
| 6,128,389 A | * | 10/2000 | Chan et al. ................. | 380/247 |

* cited by examiner

Primary Examiner—Dwayne Bost
Assistant Examiner—Sonny Trinh
(74) Attorney, Agent, or Firm—Long, Aldridge & Norman LLP

(57) ABSTRACT

The present invention relates to method for managing subscriber location information in mobile communications system. When a mobile subscriber moves to other place, wherever, registration notification(RN) is carried out from a visitor location register(VLR) to a home location register (HLR). In case of requested with overlapped the registration notification(RN) and call processing procedure about the same subscriber, the HLR protects multi-location registrations about the same subscriber until a previous registration notification(RN) is completed. Thereby, this invention relates to method for managing subscriber location information in mobile system, in order to always maintain location information about a subscriber in the HLR and VLR, correctly.

34 Claims, 9 Drawing Sheets

METHOD FOR MANAGING SUBSCRIBER LOCATION INFORMATION IN MOBILE COMMUNICATIONS SYSTEM

TECHNICAL FIELD

The present invention relates to method for managing subscriber location information in a mobile communications system. When a mobile subscriber moves to another place, registration notification is carried out from a visitor location register(hereinafter, referring to VLR) to a home location register(HLR). In case that request for the registration notification and call processing procedure about the same subscriber is overlapped, the HLR protects multi-location registrations about the same subscriber until a previous registration notification is completed. Thereby, this invention relates to method for managing subscriber location information in a mobile communications system, for always maintaining a location information about a subscriber in a HLR and a VLR, correctly.

BACKGROUND

Generally, a digital mobile communications system using CDMA(Code Division Multiple Access) comprises a home location register(HLR) and a visitor location register(VLR). The HLR has a database for managing extra service information, location information, and etc., about mobile subscribers. The VLR is used by a mobile exchanges to search information which processes a call from/to subscriber visiting area. Accordingly, the HLR should maintain exact information about a plurality of subscribers. And also, the HLR should maintain temporary information in the single VLR only, in which the information is generated according as subscribers move.

However, there is no regulation about a concrete situation in a current mobile communications standard(IS-41-C). So, when other mobile network subscribers try to call, it is frequently disconnected because the HLR could not offer subscriber information, correctly.

Figure 1:
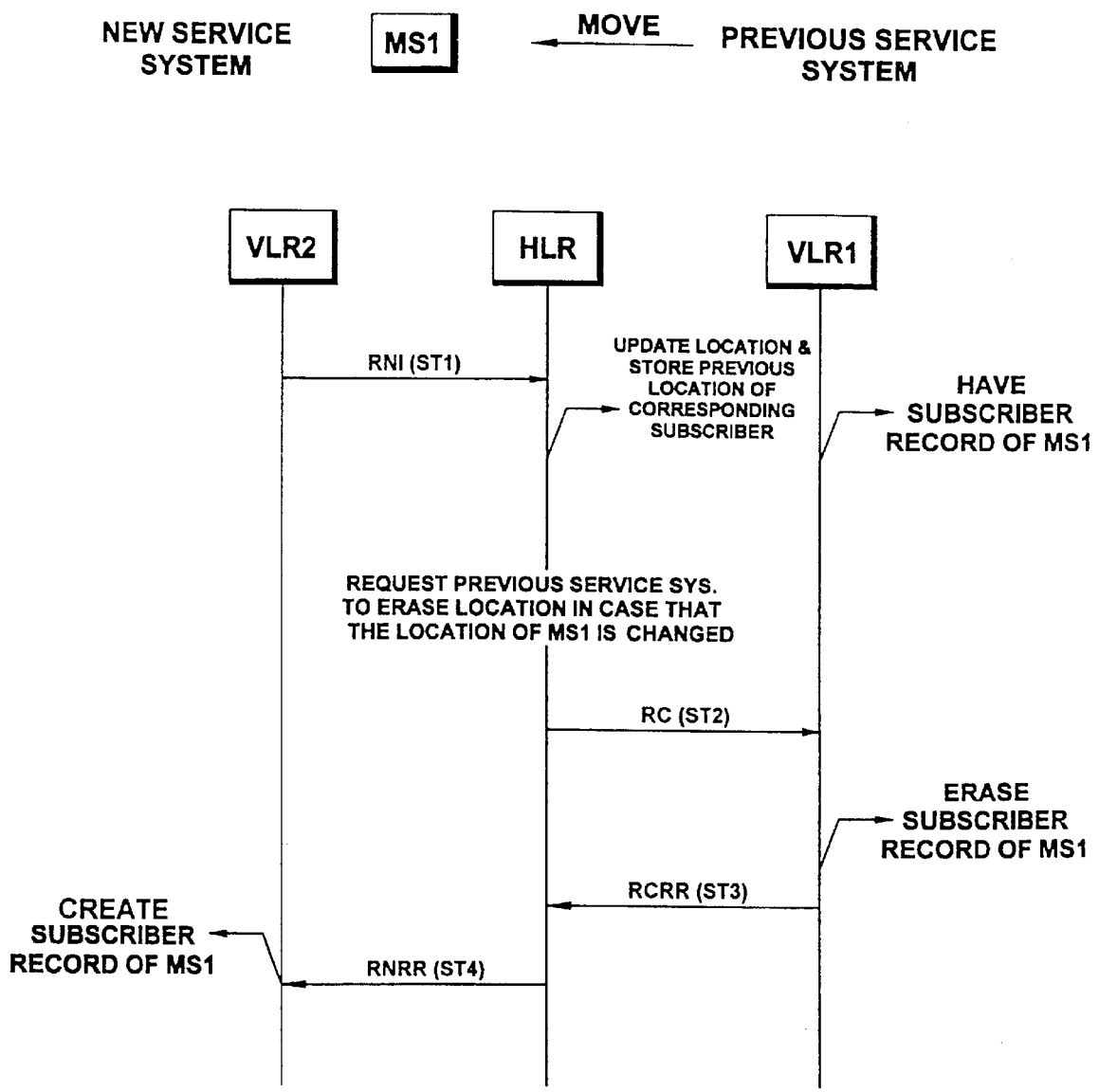

FIG. 1 is a flow chart showing a registration notification (RN) procedure of a normal mobile subscriber. It tells a case that a mobile station(MS1) moves from a previous service system area(where a first visitor location register VLR1 exists) to a new service system area(where a second visitor location register VLR2 exists).

After the VLR2 senses the MS1 and sends a registration notification invoke(RNI) message of the MS1 to the HLR according as the MS1 moves(ST1), the HLR updates and saves a location of the MS1 in database. Here, the VLR1 has a subscriber record of the MS1. The HLR thus requests the VLR1 to erase location information of the MS1(ST2). And then, VLR1 erases the subscriber record of the MS1 stored in the current database, and sends a registration cancellation return result(RCRR) message of MS1 to the HLR(ST3). After receiving the message for erasing location, the HLR sends a registration notification return result(RNRR) message of the MS1 to the VLR2(ST4). Accordingly, the VLR2 may create a subscriber record of the MS1 in the database.

Figure 2:
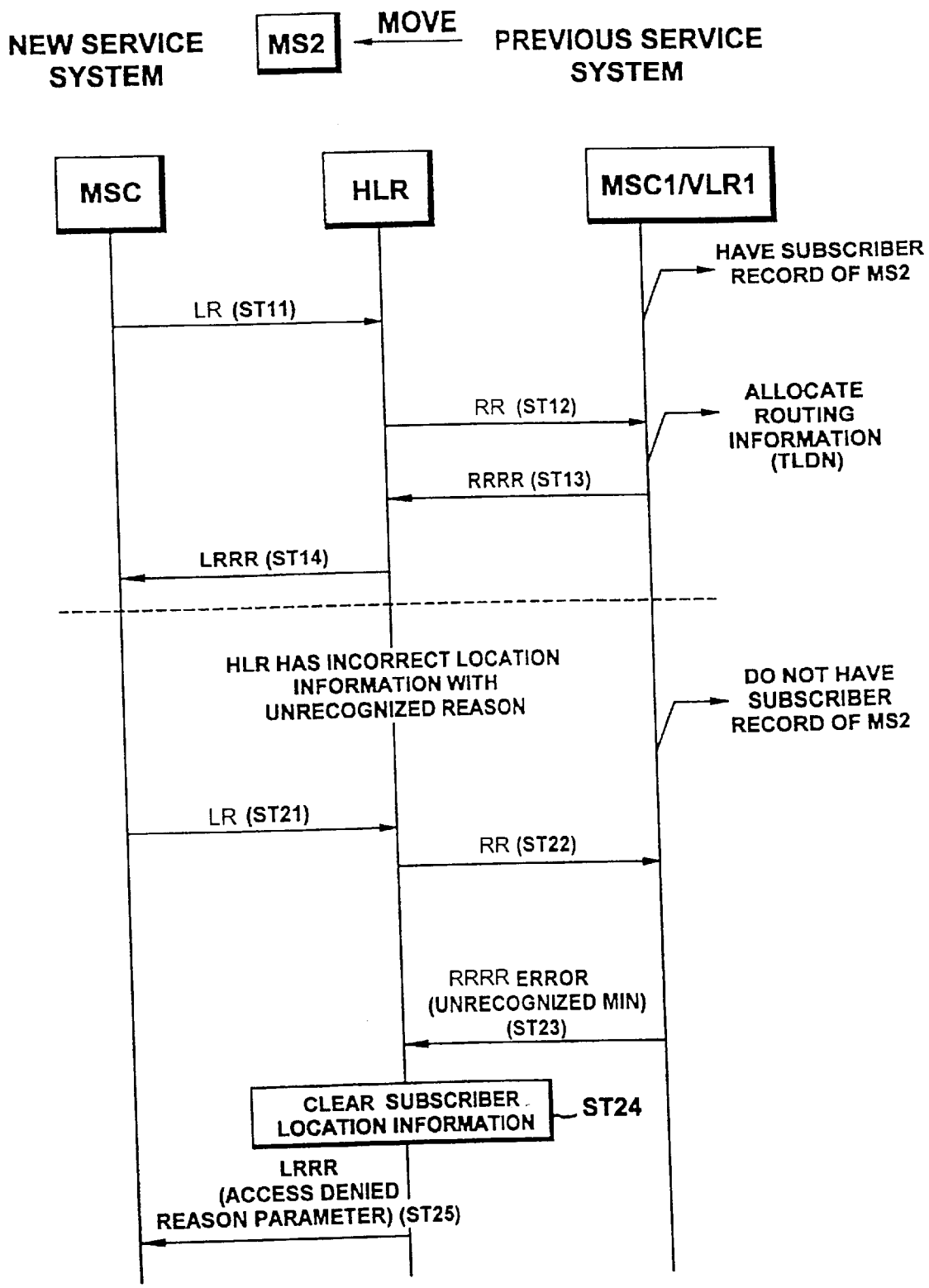

FIG. 2 is a flow chart showing a call processing procedure of a mobile subscriber. In case that a calling party's MS requests the desired called party's mobile station(MS2) to call in which the MS2 is in other service system area, the FIG. 2 shows the procedure among a calling party's mobile switching center(MSC) and the HLR and a called party's mobile switching center(MSC1).

When the calling party's MS requests the MS2 to call, the corresponding MSC of the calling party's MS sends a location request (LR) message of the MS2 to the HLR (ST11). The HLR which received the LR message from the MSC, sends a routing request (RR) message of the MS2 to a corresponding MSC1 via VLR1 of the MS2 in order to know routing information of the MS2(ST12). The called party's MSC1 receives the RR message and allocates routing information TLDN(temporary local directory number). At this time, the VLR1 has a subscriber record of the MS2. In case of receiving the TLDN of the MS2, the MSC1 sends a routing request return result(RRRR) message of the MS2 to the HLR(ST13). The HLR which received the RRRR message sends a location request return result(LRRR) message of the MS2 to the calling party's MSC(ST14).

Hereinafter, a call processing procedure of a mobile subscriber will be explained in case that the HLR has incorrect location information of the MS2 with unrecognized reasons.

First, the calling party's MSC sends a location request invoke(LRI) message of the MS2 to the HLR, showing in below of FIG. 2(ST21). The HLR sends a routing request (RR) message to the VLR1 of the MS2 in order to know location information of the MS2(ST22). Here, the VLR1 does not have the subscriber record of the MS2. Accordingly, the VLR1 sends an error code as well as routing request(RR) error message of the MS2 to the HLR, in which the error massage indicates that the subscriber can not be recognized(ST23).

Here, the HLR clears the subscriber location information stored in the HLR database(ST24). And then the HLR sends a location request return result(LRRR) message with an access denied reason parameter of the MS2 to the calling party's MSC. As a result, the call is failed.

Figure 3:
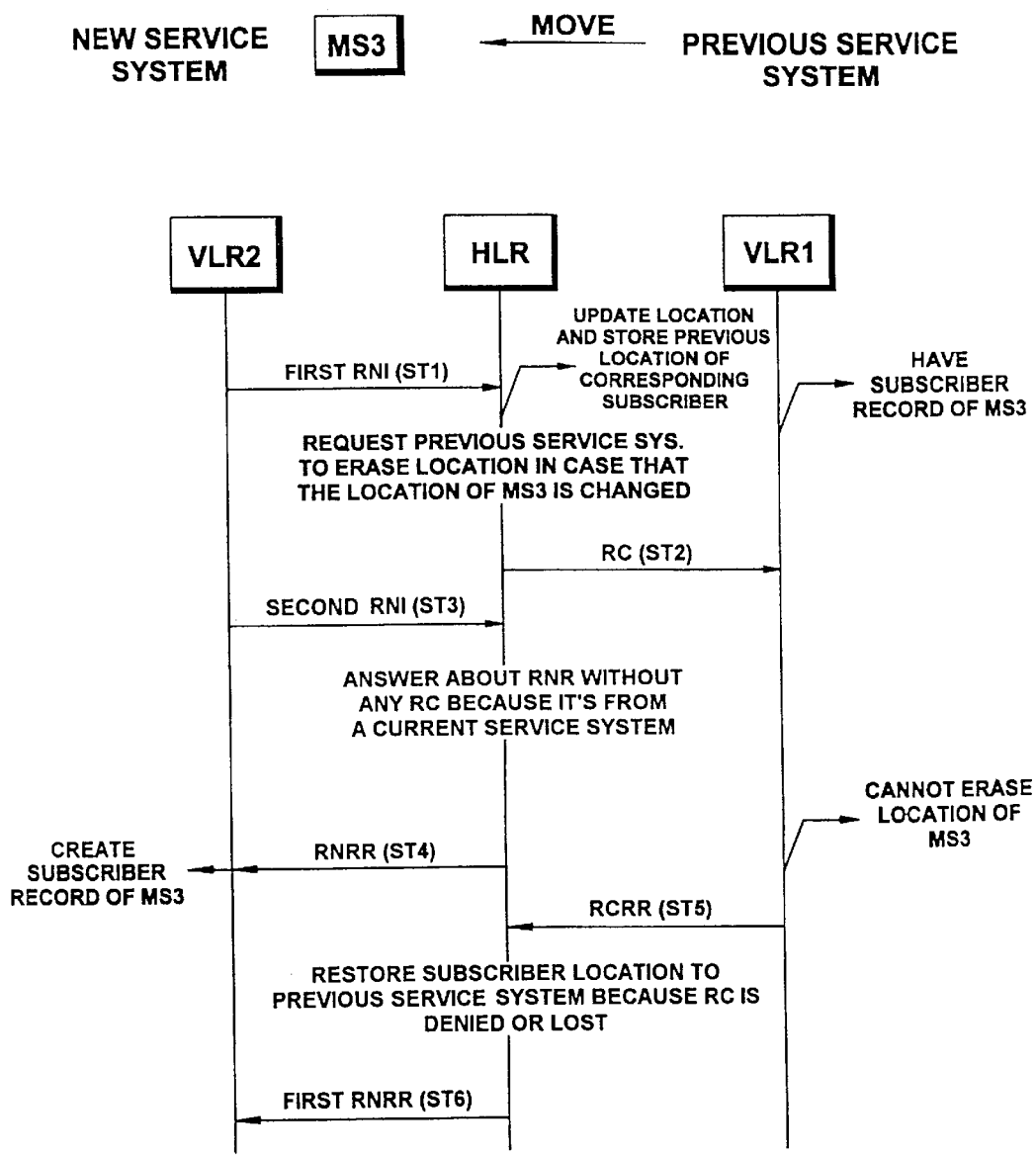

In case that a mobile station(MS3) moves to a new serving area, location information of the subscriber is registered on at least two VLRs, respectively. And it will be now explained in FIG. 3 showing a registration notification(RN) flowchart of a mobile subscriber.

When a mobile station(MS3) moves to a new serving area, the VLR2 in a new serving area senses the MS3 and requests the HLR a first registration notification invoke (RNI) of the MS3(ST1). The HLR updates the location of the MS3 and stores a previous location on database. Here, the VLR1 still has the subscriber record of the MS3. Accordingly, the HLR requests the VLR1 registration cancellation(RC)of the MS3(ST2).

But, in case that the VLR2 requests the HLR a second RNI(ST3), the HLR answers about a registration notification request(RNR) without any registration cancellation(RC) procedure because it's from a current service system, again. Accordingly, the HLR sends a second registration notification return result(RNRR) message of the MS3 to the VLR2 (ST4). Consequently, a subscriber record of the MS3 is created in the VLR2.

Besides, in case that a registration cancellation request (RCR) of the MS3 requested by the HLR to the VLR1, is not carried out because the MS3 is busy, and etc., the VLR1 sends a registration cancellation return result(RCRR) message with a cancellation denied parameter to the HLR(ST5). Because the RCR of the MS3 is denied, the HLR restores a location information of the database and sends a first RNRR message with an access denied reason parameter to the VLR2 in order to re-register the location of the MS3 in the VLR1 where the previous service system is provided (ST6).

The HLR is operated in the same way when the answering information is lost in the step (ST2 or ST5). Even though a first registration notification(RN) of the MS3 failed, the database of the VLR2 already has the subscriber record of the MS3 by requesting the second RN(ST3) and also, the subscriber record which established in the database of the VLR1, was not canceled. Consequently, both visitor location registers VLR1, VLR2 have a subscriber record of the MS3.

Like this way, when the other mobile subscriber tries to call, the HLR can not carry out a normal call processing because the HLR and VLR have incorrect information about a corresponding subscriber.

Figure 4:
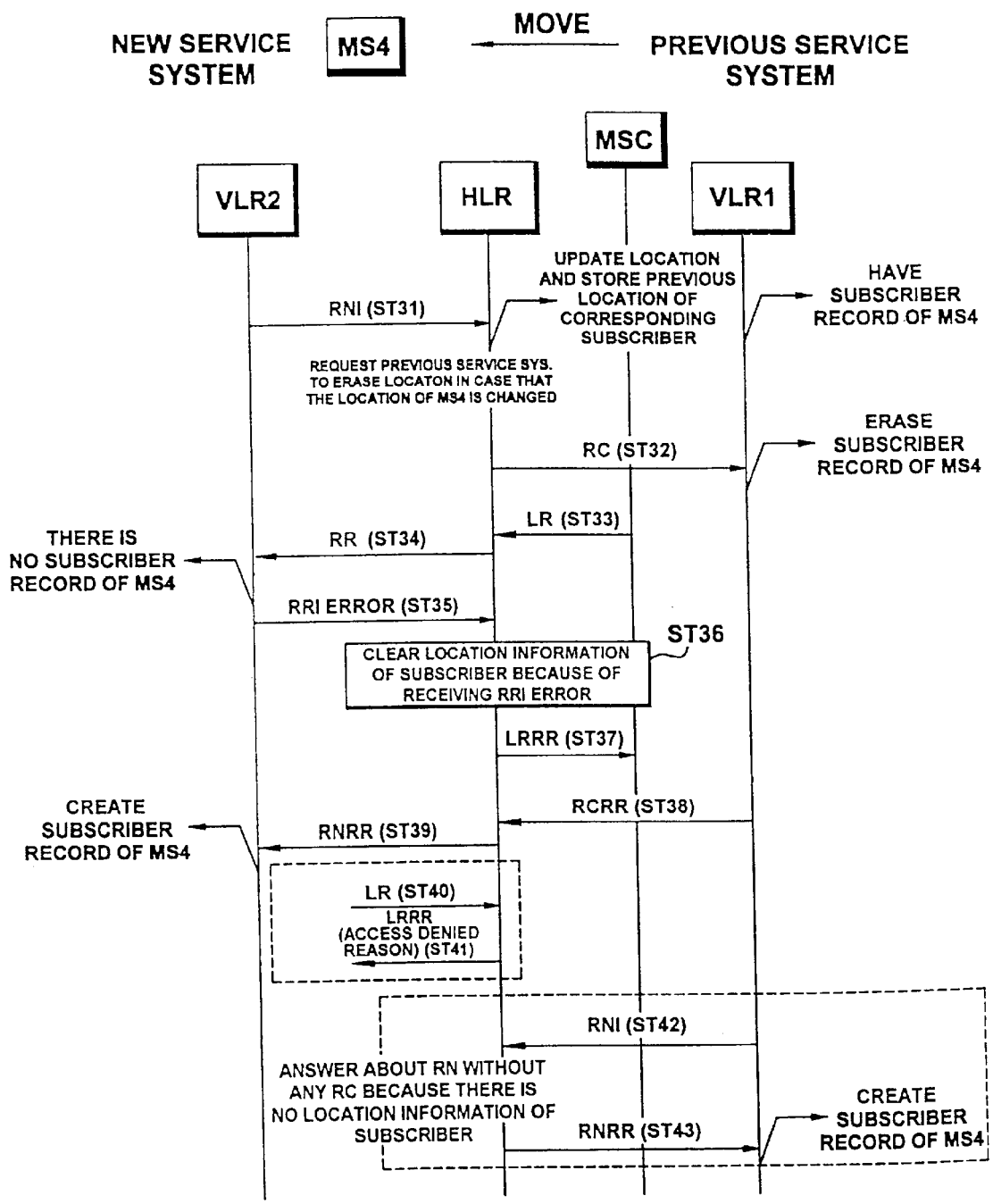

FIG. 4 shows a signal processing flowchart for explaining errors. The errors may be happened in case that a registration notification(RN) and call processing procedures about same mobile subscriber are overlapped showing in FIG. 1 to FIG. 2, when a mobile station(MS4) moves to another serving area.

In case that the MS4 moves to a new serving area, a VLR2 senses the MS4 and requests a registration notification invoke(RNI) to the HLR(ST31). The HLR updates the location of the MS4 and stores the previous location in database. The VLR1 has a subscriber record of the MS4. And then the HLR requests the VLR1 a registration cancellation(RC)of the MS4(ST32). Therefore the VLR1 erases the subscriber record of the MS4.

Here, when the subscriber record of the MS4 is normally erased in the VLR1, the VLR1 sends a registration cancellation return result(RCRR) message to the HLR(ST38), in which the message tells that the subscriber record of the MS4 is erased. The HLR finally sends a registration notification return result(RNRR) message which requested by the VLR2, to the VLR2(ST39). And the VLR2 creates the subscriber record of the MS4 in the database.

But, there is a situation that a location request (LR) message of the same MS4 above is sent from a mobile switching center(MSC) which does not request a registration notification(RN) before the RN requested from the VLR2 is not completed normally(ST33). In above situation, the HLR tries to receive a temporary local directory number(TLDN) by sending a routing request(RR) message to a new service system(ST34), because the location information of a corresponding subscriber, which is stored in the HLR database, is already updated to the information of a new service system. But, the VLR2 does not have the subscriber record of the corresponding MS4 because the RN of the MS4 is processing in the current new service system. Accordingly, the VLR2 sends the RR error message of the MS4 to the HLR as an answer of the RR(ST35). And then, the HLR, received the error message, clears the subscriber location information of the MS4 of the database(ST36). The HLR then sends the location request return result(LRRR) message to the MSC (ST37).

Here, there is another situation that a location request invoke(LR) message of the MS4 is sent from a MSC to the HLR by called signal request of the same MS4 above(ST40). In this case, the HLR has already cleared the location information of the MS4 by receiving the routing request (RR) error message in the step(ST36). Consequently, the HLR does not have the subscriber location information of the MS4. Accordingly, the call is failed by sending the location request return result(LRRR) message with access denied reason of the MS4 to the corresponding MSC where requested the location information(ST41).

Additionally, the VLR1 sends the registration notification invoke(RNI) message of the MS4 to the HLR in case that the MS4 moves to another serving area (explained by drawings as an example, the MS4 moves to an area where the VLRL manages)(ST42).

But, because the subscriber location information of the MS4 is already cleared in the HLR database, the registration cancellation(RC)is not requested to the VLR2 of the previous serving area. And by sending the registration notification return result(RNRR) message of the MS4 to the VLRL (ST43), the VLRL creates a subscriber record of the MS4 in the VLR1 database.

The VLR2 already has the subscriber record of the MS4, therefore does not request the registration notification(RN) to the HLR in case that the MS4 moves to a serving area where has a current subscriber record(explained by drawing as an example, the MS4 moves to an area where the VLR2 manages). Accordingly, it is easy to fail when the other mobile subscriber try to call because the HLR is managing an incorrect subscriber location information of the MS4.

In above case, there is no way that a user of the corresponding mobile station(MS) can check the reason of disconnection except calling to a mobile communications company. And a VLR operator should select and erase useless subscriber records in the VLR database. But, the way to solve like above is not the essential solution and there are possibilities that the same problem happens successively.

SUMMARY

Thus taking the above-mentioned problems into consideration, a first objective of the present invention is to solve the problems in method for managing subscriber location information in a mobile communications system, as described above, by maintaining correctly temporary information of the same subscriber in a single VLR only by a HLR, when two VLRs request the HLR registration notification as overlapped, in case that a mobile station moves from a previous serving area to other area.

A second objective of the present invention is to provide a method for managing subscriber location information in a mobile communications system, in which a HLR maintains currently a correct location of a corresponding subscriber when a registration notification(RN) and call processing procedure of the same subscriber are happened by overlapped.

According to an embodiment to achieve the first object of the present invention, a method for managing subscriber location information in a mobile communications system, comprising processes of carrying out a corresponding registration notification(RN) of a mobile station(MS) in a HLR and indicating that the registration notification(RN) is processing when the MS moves to a previous serving area, and preventing multi-location registrations about a same subscriber during handling a registration notification(RN).

According to another embodiment to achieve the first object of the present invention, a method for managing subscriber location information in a mobile communications system, comprising processes of carrying out a corresponding registration notification(RN) of a MS in a HLR and in a corresponding VLR that the registration notification(RN) is processing when the MS moves to a new serving area, and preventing multi-location registrations about a same subscriber during handling a registration notification(RN).

According to the other embodiment to achieve the second object of the present invention, a method for managing subscriber location information in a mobile communications system, comprising processes of carrying out a corresponding registration notification(RN) of a MS in a HLR and indicating that the registration notification(RN) is processing when the MS moves to a new serving area and ignoring multi-location registration signals about a same subscriber and a call processing signal from an exchange during registering the location until a previous registration notification(RN) is erased.

According to a 4th embodiment to achieve the second object of the present invention, a method for managing subscriber location information in a mobile communications system, comprising processes of carrying out a corresponding registration notification(RN) of a MS in a HLR and indicating in a corresponding VLR that the registration notification(RN) is processing when the MS moves to an area where a new service system is provided, and ignoring multi-location registration signals about a same subscriber and a call processing signal from an exchange during registering the location until a previous registration notification(RN) is erased.

BRIEF DESCRIPTION

Figure 5:
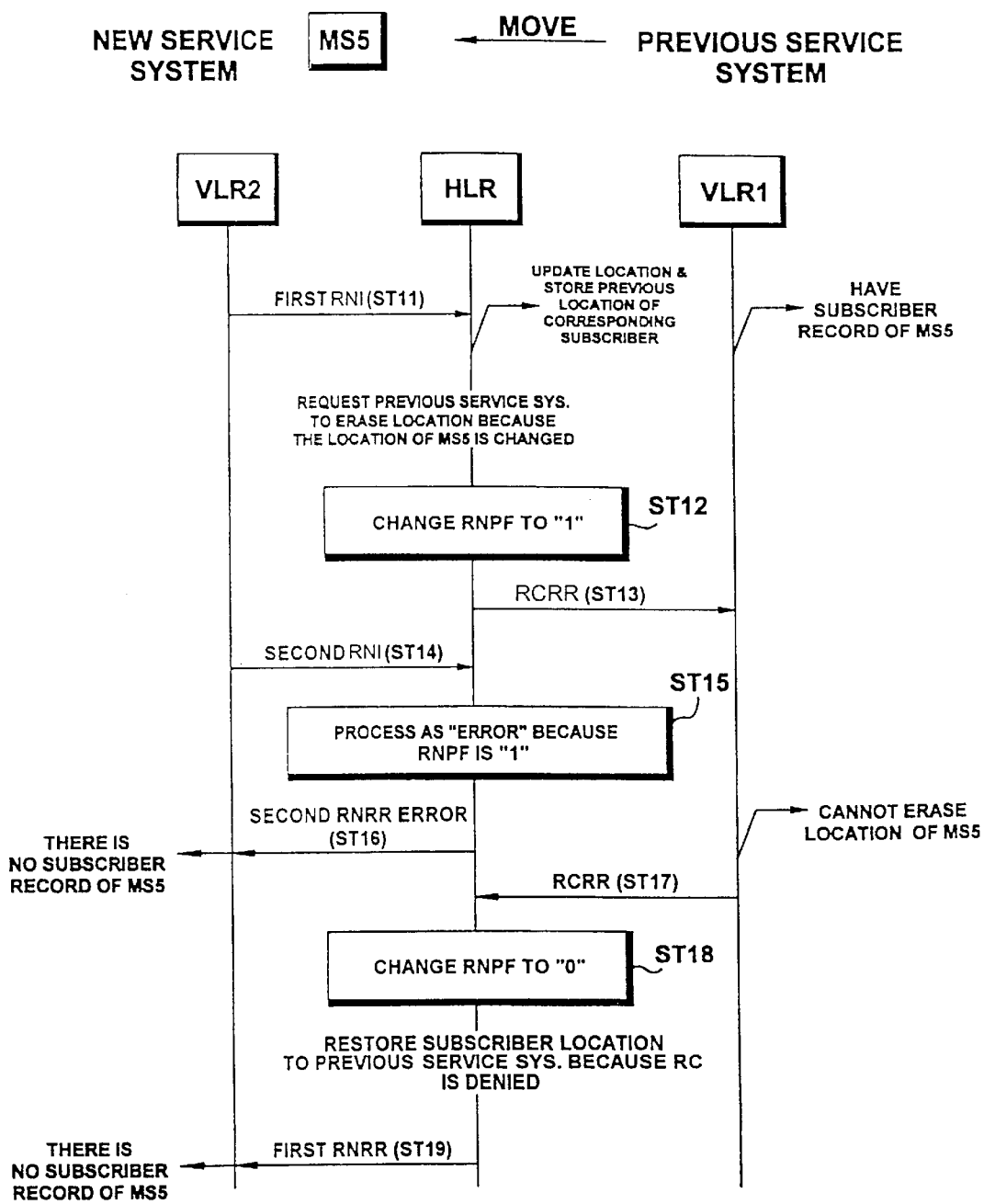
Figure 6:
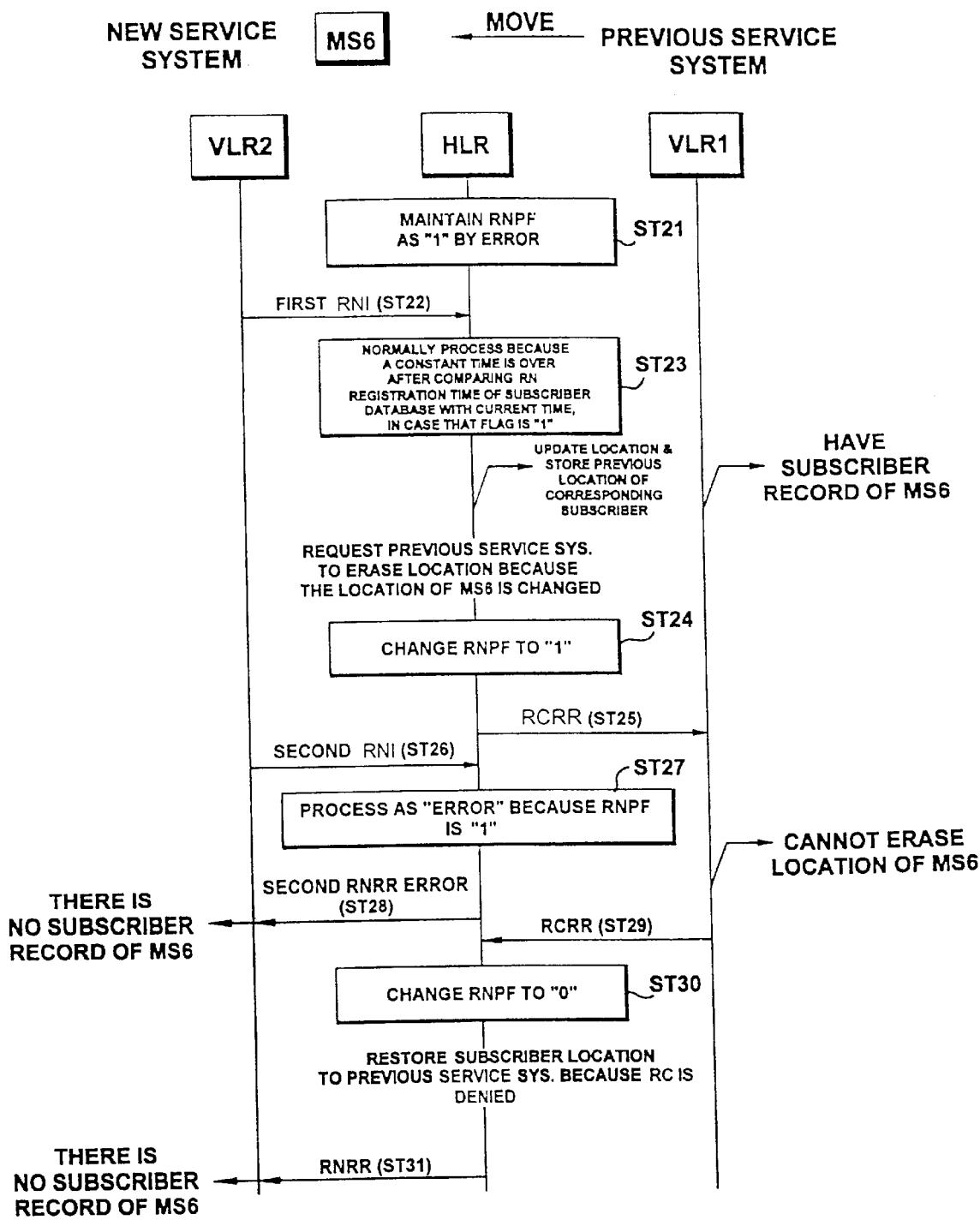
Figure 7:
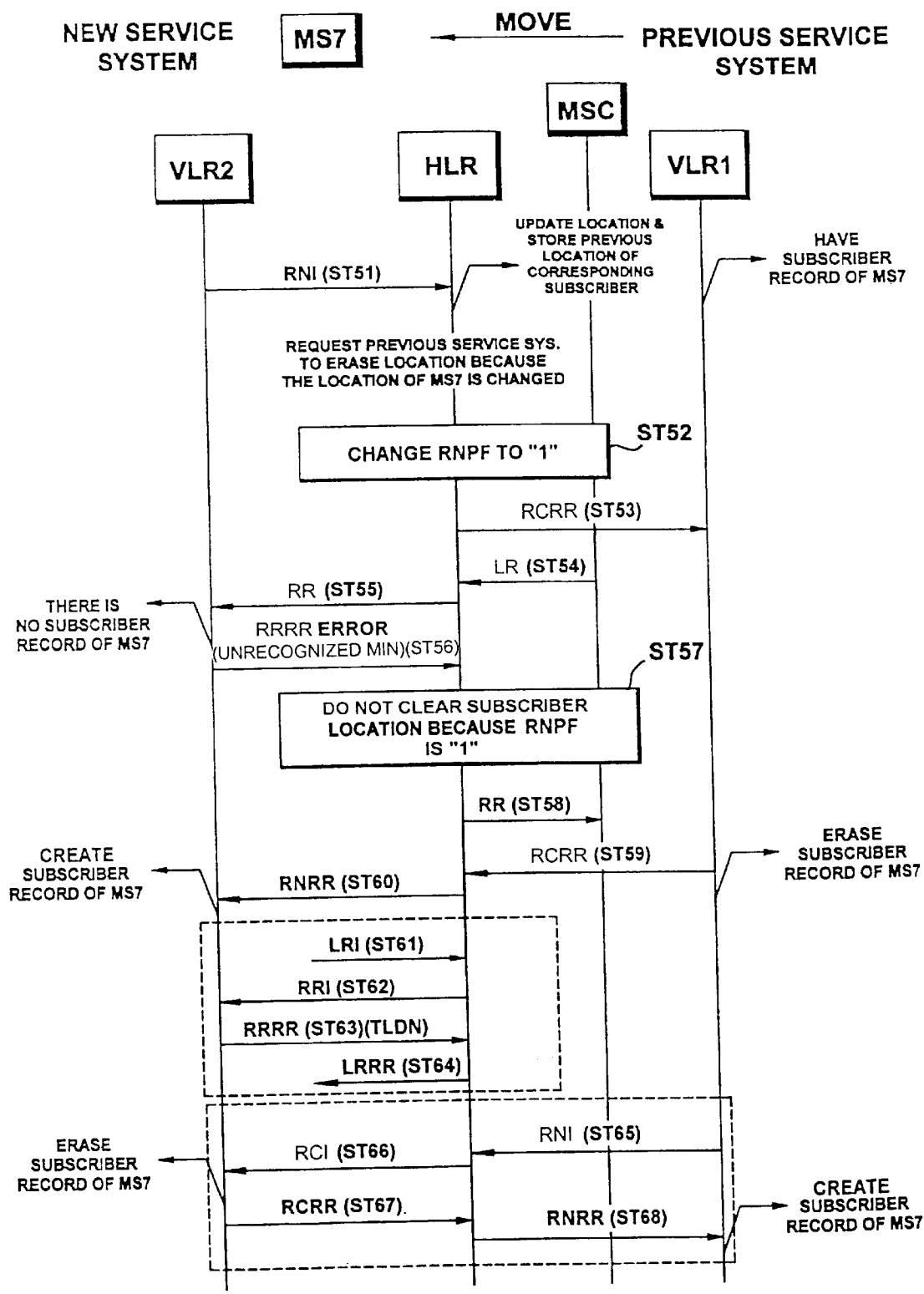
Figure 8:
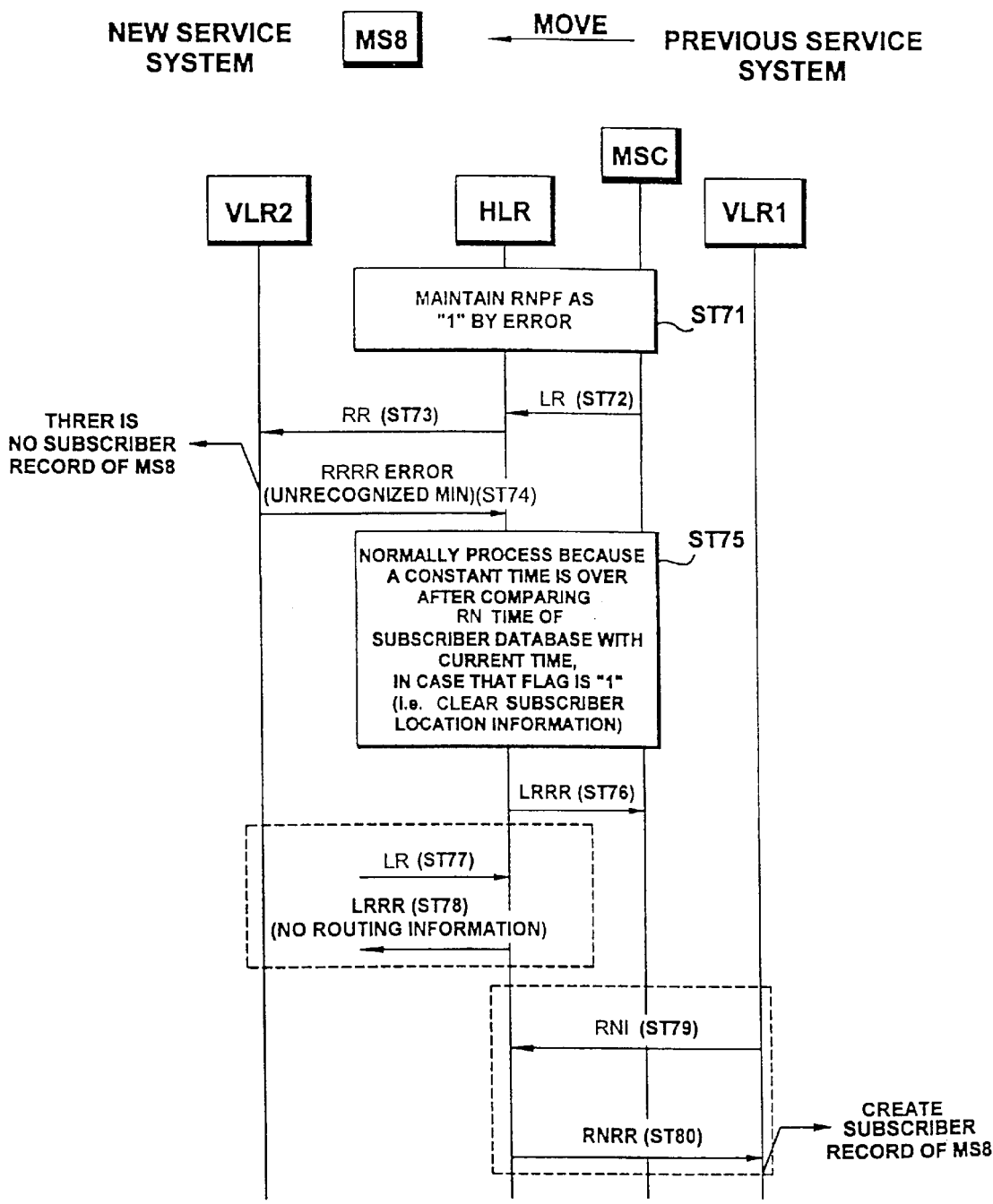
Figure 9:
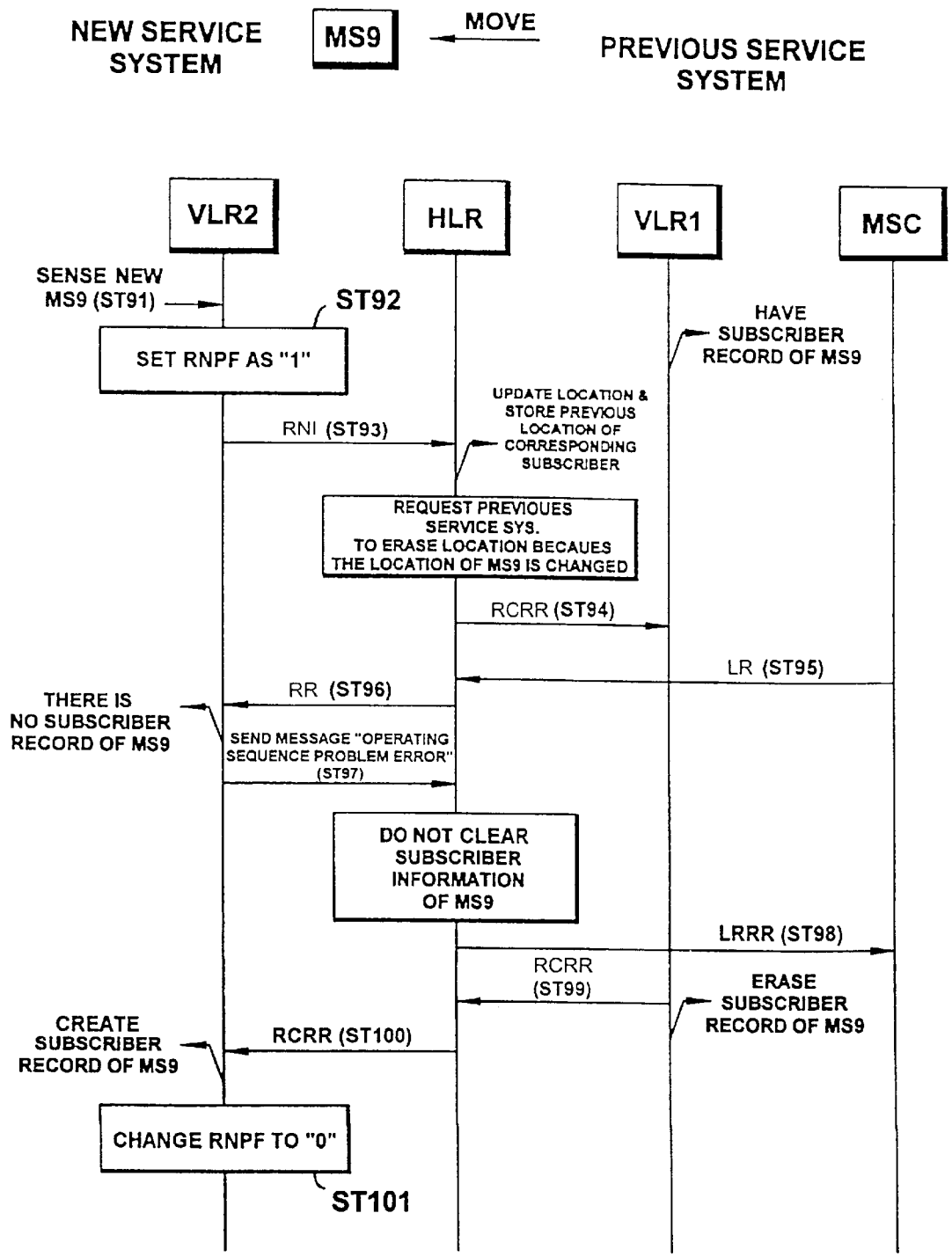

The invention and its modes of use and advantages are best understood by reference to the following description of illustrative embodiments when read in conjunction with the accompanying drawings, wherein:

FIG. 1 is a flowchart showing a registration notification procedure of a mobile subscriber, FIG. 2 is a flowchart showing a call processing procedure of a mobile subscriber, FIG. 3 is a flowchart explaining an error that location information of a mobile subscriber is registered by overlapped in two more VLRs, respectively, FIG. 4 is a flowchart explaining an error which may be generated when a registration notification and a call processing procedure are carried out by overlapped about the same mobile subscriber of FIG. 1 to FIG. 2, FIG. 5 is a flowchart showing one embodiment of the present invention for preventing the error of the FIG. 3, FIG. 6 is a flowchart explaining a procedure for preventing a misoperation which may be happened again in the embodiment of FIG. 5, FIG. 7 is a flowchart showing another embodiment of the present invention for preventing the error of the FIG.4, FIG. 8 is a flowchart explaining a procedure for preventing a misoperation which may be happened again in the embodiment of FIG. 7, and FIG. 9 is a flowchart showing the other embodiment of the present invention for maintaining a correct location information in a HLR and a VLR during registration notification process of a mobile subscriber.

DETAILED DESCRIPTION

The method of the present invention will be described in detail with reference to FIGS. 5 to 9 according to each embodiment of the present invention.

FIG. 5 is a flowchart explaining method for managing a subscriber location information in a mobile communications system according to one embodiment of the present invention. It prevents location information of a mobile subscriber from being registered in two more VLRs, respectively, in case that a MS5 moves from a previous serving area, to a new serving area.

In the figure, a MS5 moves from a previous serving area to a new serving area. A corresponding visitor location register(hereinafter, a second visitor register is referred to VLR2) of the new serving area senses the MS5 and sends a first registration notification (invoke RNI) message of the MS5 to the HLR(ST11). The HLR updates the location of the MS5 and stores the previous location in database. Here, the previous visitor location register(hereinafter, a first visitor location register is referred to VLR1) has a subscriber record of the MS5. Accordingly, the HLR receives a registration notification invoke(RNI) message and sets a registration notification pending flag(RNPF) of the MS5 to "1" until the registration notification(RN) is completed, in which the flag is formed in the HLR database. And the HLR sends a registration cancellation return result (RCRR) message of the MS5 to the VLR1(ST13). Here, a state that the HLR is now carrying out the registration notification(RN) of the MS5 is indicated, in which the state is that the registration notification pending flag(RNPF) is set as "1". Accordingly, the HLR is processed as errors which are generated before the registration notification pending flag(RNPF) bit value of the MS5 is changed "1" about all additional return result (RCRR).

The HLR sends an error to VLR2 for a second registration notification return result(RNRR) because the registration notification pending flag(RNPF) bit value of the MS5 in its database is set as "1". As a result, a subscriber record of the MS5 is not created in the VLR2.

Besides, the VLR1 sends a registration cancellation return result(RCRR) with cancellation denied parameter or error message of the MS5 to the HLR when the registration cancellation return result(RNRR) of the MS5, which is requested from the HLR to the VLR1, is not carried out with some reasons, in such a case of a MS is busy, and so on(ST17). Accordingly, the HLR receives the registration cancellation return result(RCRR) with cancellation denied or error message of the MS5 and changes the registration notification pending flag(RNPF) bit value to "0". And then the HLR sends a first registration notification return result (RNRR) message of the MS5 to the VLR2(ST19). As a result, a subscriber record is not created in the VLR2.

The HLR processes the meaningful registration notification (invoke RNI) message only, even though the VLR2 requests the registration notification(RN), overlapped in the same MS Therefore, the HLR and the VLR1 and the VLR2 can always maintain the location information of a MS, correctly.

FIG. 6 is an operational flowchart for preventing that the HLR has errors for managing the flag.

When a registration notification pending flag(RNPF) stored in the HLR database is maintained as "1" by the errors(ST21) in FIG. 6. And the VLR2 sends a first registration notification invoke(RNI)-message of the MS6 to the HLR by sensing the MS6 in case that a MS6 moves from a previous serving area, to other new serving area. At this time, the registration notification pending flag(RNPF) of the current database is set as "1". So the HLR compares a latest registration notification time of the MS6 with a current time in order to determine whether the registration notification (RN) is carrying out or is a bit value set by an error. After comparing, the HLR determines that the registration notification(RN) is carrying out the operation and maintains the registration notification pending flag(RNPF) and processes the registration notification invoke(RNI) generated right before to error, in case that a predetermined constant time is not over (explained that the time is set by 6 seconds in the embodiment). Otherwise, the HLR determines that the flag management has an error, resets the registration notification pending flag(RNPF) and normally takes the registration notification invoke(RNI) generated right before, in case that predetermined constant time is over(ST23). And then, the HLR updates the location information of the MS6 and stores the previous location in the database. At this time, the VLR1 has a subscriber record of the MS6. Accordingly, the HLR sets the registration notification pending flag(RNPF) bit value, which is in the HLR database, to "1" until the registration notification(RN) operation is completed. And the HLR sends the registration cancellation return result (RCRR) message of the MS6 to the VLR1(ST25). Here, in case that the registration notification pending flag(RNPF) is set as "1", all additional registration notification invoke (RNI) messages are processed as an error before the registration notification pending flag(RNPF) value is changed to "0".

But, there is a case that the VLR2 sends a second registration notification invoke(RNI) message to the HLR by a particular reason(ST26). The HLR processes the second requested registration notification(RN) message as an error (ST27) and then sends the second registration notification return result(RNRR) return with error message of the MS6 to the VLR2(ST28) because the registration notification pending flag(RNPF) bit value which is in the database, is set as "1". Accordingly, a subscriber record of the MS6 is not created in the VLR2.

Besides, the VLR1 sends a registration cancellation return result(RCRR) message of the MS6 to the HLR(ST29) when the registration cancellation invoke of the MS6 is refused because the MS is busy, and so on. The registration cancellation invoke(RCI) of the MS6 was required from the HLR to the VLR1. The HLR therefore changes the registration notification pending flag(RNPF) bit value to "0" in order to notice that the current registration notification(RN) is completed, in case of receiving the registration cancellation return result(RCRR) message of the MS6. The HLR sends a first registration notification return result(RNRR) message of the MS6 to the VLR2(ST31). As a result, a subscriber record of the MS6 is not created in the VLR2.

FIG. 7 is a flowchart according to the other embodiment of the present invention. It shows how to prevent the same mobile subscriber from being remained in two more VLRs when a registration notification(RN) procedure and the call processing procedure about the same mobile subscriber is overlapped.

The new serving VLR2, senses the MS7 and requests a registration notification invoke(RNI) to the HLR(ST51), in case that the MS7 moves to other new serving area. The HLR updates the location information of the MS7 and store a previous location information in the database. And the VLR1 has the subscriber record of the MS7. As a result, the HLR sets a registration notification pending flag(RNPF) bit value which is in the HLR database as "1" until a registration notification(RN) is completed(ST52). And the HLR indicates that the registration notification(RN) is carrying out the operation sends a registration cancellation return result (RCRR) message of the MS7 to the VLRL (ST53).

There is a case that a location message about the same MS7 is sent from another MSC to the HLR(ST54), in which the MSC does not request the registration notification(RN), before the requested registration notification(RN) is normally completed. In this case, a subscriber location information stored in the HLR database is already changed to a new service system. Therefore, the HLR sends a routing request message to the new service system and tries to receive the TLDN(ST55).

But, the VLR2 does not have a subscriber record of the corresponding MS7 because the registration notification (RN) requested from the new service system, is in process. Accordingly, the VLR2 sends a routing request(RR) error message(indicating an unrecognized MIN) of the MS7 as a return error about the routing request(RR) message to the HLR(ST56).

The HLR does not clear the location information of the MS7 because the current registration notification pending flag(RNPF) bit value is "1" after receiving an error message about the routing request invoke(RRI)(ST57). And then, the HLR sends a return result message of the location request to the MSC(ST58), the call is failed. After sending a registration cancellation return result(RCRR) from the VLR1 to the HLR, the HLR changes the registration notification pending flag(RNPF) bit value to "0" and indicates that the registration notification(RN) is completed, and sends the return result message as well as subscriber profile information to the VLR2, in which the registration notification pending flag(RNPF) is in the HLR database. As a result, a subscriber record of the MS7 is created in the VLR2(ST60).

At this time, there is a case that a location request message of the MS7 is sent from other mobile exchanges(not showing in the figure) to the HLR, by that a called signal request of the same MS7 is created, shown in below of FIG. 7(ST61). In this case, the HLR has the location information of the MS7 because the HLR did not clear the location information about the MS7 of the HLR database in the step(ST57). Accordingly, in case that the HLR sends the routing request message to the VLR2 in order to know the location information of the MS7(ST62), the VLR2 sends a routing request return result(RRRR) message of the MS7 to the HLR(ST63).

Additionally, the VLR1 sends the registration notification invoke(RNRR) message of the MS7(ST65), in case that the MS7 moves to a previous serving area(or the other service system, this embodiment is explained when the MS7 moves again to the previous serving area). The HLR did not clear the subscriber location information stored in the database. Therefore, the HLR sends the registration cancellation (invoke RCI) message of the MS7 to the VLR2(ST66) and the VLR2 erases the subscriber record of the MS7 stored in the VLR2 database and sends a corresponding registration cancellation return result(RCRR) message to the HLR (ST67). Accordingly, the HLR sends the registration notification return result (RNRR) message of the MS7 to the VLR1(ST68). As a result, the VLRL creates a subscriber record of the MS7.

Accordingly, location information of the current MS7 may be correctly maintained in the HLR and single VLR only(VLR1 or VLR2).

FIG. 8 shows a flowchart explaining how to prevent a flag management misoperation during operation of preventing an error generation in case that a registration notification(RN) and call processing procedures are overlapped of FIG. 7.

There is a case that a MSC sends the location request message of a MS8 to the HLR when the HLR registration notification pending flag(RNPF) is maintained as "1" with unknown reasons(ST71). The HLR sends a routing request message of the MS8 to the VLR2(ST73). But the VLR2 does not have a subscriber record of the MS8. The VLR2 sends a routing request return result(RRRR) error message of the MS8 to the HLR(ST74). The registration notification pending flag(RNPF) bit value in the HLR database is "1". Accordingly, the HLR examines whether the latest registration time is passed over the predetermined constant time(6 seconds) by comparing the latest registration time of the MS8 with current time. After passed over the constant time, the HLR clears the subscriber location information stored in the HLR database(ST75) and sends the location request return result(LRRR) message of the MS8 to the MSC (ST76).

Here, the HLR sends the location request return result (LRRR) message to the MSC where sends the location request message in case that the other MSCs (not showing in FIG.) send the location request message of the MS8 to the HLR(ST77), in which the location request return result (LRRR) message tells that there is no routing information of the MS8.

Additionally, in case that the MS8 moves to the previous serving area, the VLR1 of the corresponding area sends a registration notification message of the MS8(ST79). And the HLR stores the subscriber location information of the MS8 in database sends the registration notification return result (RNI) message to the VLR1 without requesting the registration cancellation(RC) of other VLR(ST80). As a result, the VLR1 creates a subscriber record of the MS8.

FIG. 9 is a flowchart explaining a method for managing a subscriber location information. It shows that a registration notification pending flag(RNPF) set/reset and error generation preventing operation using the pending flag set/reset which are accomplished in the HLR in each embodiment above, are accomplished in a VLR. It tells that the HLR and a previous visitor location register(VLR1) and the current visitor location register(VLR2) maintains correct location information during a registration notification(RN) of a mobile station(MS9). It is understood that each embodiment shown in FIG. 5 to FIG. 8 explains a below operation.

As shown in FIG. 9, the corresponding VLR2 senses the MS9(ST91), sets the registration notification pending flag (RNPF) as "1" (ST92) and sends a registration notification invoke(RNI) message of the MS9 to the HLR(ST93) in case that the MS9 moves from a previous serving area to other new serving area. Here, the VLR1 has a subscriber record of the MS9 and the HLR updates the location of the MS9 and stores a previous location of the MS9.

And then, the HLR recognizes that the location of the MS9 is changed, therefore sends a registration cancellation return result(RCRR) message to the VLR1(ST94) and waits for answering that. The HLR sends a routing request message to the VLR2 in case that a mobile switching center (MSC) requests the location of the MS9 during the answering waiting state(ST95, ST96).

But, the VLR2 does not have a subscriber record in the database because of not receiving an answer about the current registration notification(RN). Additionally, the VLR2 registration notification pending flag(RNPF) is set as "1".

Accordingly, the VLR2 sends "operator sequence problem error" message besides "recognized MIN error" message as a routing request return result(RRRR) of the MS9 (ST97). Therefore, the HLR does not clear subscriber information and sends the location request return result (LRRR) to the MSC(ST98). As a result, the HLR may maintain a correct subscriber information.

As following, when the HLR receives the registration cancellation return result (RCRR) message of the MS9 from the VLR1(ST99), the HLR sends a registration notification return result(RNRR) message of the registration cancellation return result(RCRR) to the VLR2(ST100). In this case, the VLR2 creates a subscriber record of the MS9 in the database and changes the registration notification pending flag(RNPF) as "0"(ST101). As a result, the VLR2 indicates the registration notification completion and helps that another registration notification(RN) and call processing is normally carried out.

As described above, when a mobile subscriber moves from a previous serving area to a new serving area, the HLR may maintain a current location information only of subscriber even though single VLR requests the registration notification(RN) of single MS by overlapped(or two VLR request the registration notification(RN), respectively).

Additionally, the present invention may maintain temporary information of the same subscriber in signal VLR as well as a current location of subscriber in HLR correctly in case that the registration notification(RN) and call processing procedure of the same subscriber are overlapped. Therefore, it can be improved reliability about a call connection in a mobile communications system.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

What is claimed is:

1. Method for managing subscriber location information in a mobile communications system, comprising processes of:

carrying out a corresponding registration notification (RN) of a mobile station (MS) in a home location register (HLR) and indicating that the registration notification (RN) is processing when the MS moves to a new serving area, and using said indication that the RN is processing to prevent multi-location registrations about a same subscriber during the RN.

2. Method for managing subscriber location information in a mobile communications system according to claim 1, wherein the process of preventing multi-location registration comprises the steps of:

(a) carrying out registration notification (RN) of the MS in the HLR and indicating, at one of the group consisting of the HLR and a visitor location register (VLR), that the registration notification (RN) is processing, (b) requesting a registration cancellation (RC) of the MS from a first visitor location register (hereinafter, a VLR1) which is in an area where a previous service system of the MS is provided and waiting for answering message from the VLR1, and (c) indicating the registration notification completion in case that there is an answering message about a registration cancellation return result (RCRR) from the VLR1 in answering waiting state of step (b), and then processing about the answering message received from the VLR1.

3. Method for managing subscriber location information in mobile communications system according to claim 2, wherein in step (a), the state during registering the location of the HLR is indicated using a registration notification pending flag(RNPF) bit value which is set in a HLR database.

4. Method for managing subscriber location information in a mobile communications system according to claim 2, wherein in step (c), the registration notification completion state of the HLR is indicated using a registration notification pending flag(RNPF) bit value which is set in the HLR database.

5. Method for managing a subscriber location information in a mobile communications system according to claim 2, wherein step (a) further confirming a registration notification pending flag(RNPF) bit value of the MS before the registration notification procedure of the MS, to which the registration notification(RN) is requested, is carried out, rechecking a latest set registration time of the MS in case that the bit value indicates that the registration notification(RN) is carried out after confirming the flag, changing the flag to the bit value of the registration notification completion state by determining that the registration notification pending flag(RNPF) is set incorrectly caused by an error, in case that the registration time is passed over a predetermined time, after checking the time and then returning to the normal registration notification procedure step.

6. Method for managing subscriber location information in a mobile communications system according to claim 2, wherein step (b) further comprises the substeps of:

determining whether a second visitor location register VLR2 requests a second registration notification(RN) of the same MS in the state of a registration cancellation return result(RCRR) waiting state of the MS, checking a registration notification pending flag(RNPF) bit value in case that there is a second registration notification invoke(RNI) after the determination, processing the registration notification(RN) as an error when the registration notification pending flag(RNPF) bit value is set after checking.

7. Method for managing subscriber location information in a mobile communications system according to claim 2, wherein step (c) further comprises the substep of:

restoring a subscriber record of the MS, stored in the HLR database, to the VLR1 in case that a registration cancellation return result(RCRR) message of the MS is answered from the VLR1.

8. Method for managing subscriber location information in a mobile communications system according to claim 5, wherein a latest set registration time indication method uses a latest registration time indication value established in the HLR database.

9. Method for managing subscriber location information in a mobile communications system, comprising processes of:

carrying out a corresponding registration notification (RN) of a MS in a HLR and indicating, at one of the group consisting of the HLR and a visitor location register (VLR), that the registration notification (RN) is processing when the MS moves to a new serving area, ignoring multi-location registration signals about a same subscriber and a call processing signal from an MSC during the RN.

10. Method for managing subscriber location information in a mobile communications system, wherein the process of ignoring multi-location registration signals and a call processing signal comprises the steps of:

(a) carrying out registration notification(RN) of a corresponding MS in a HLR and indicating that the registration notification(RN) is processing, (b) requesting a registration cancellation(RC) of the MS from a VLR1 which is in a previous serving area and waiting for answering message from the VLR1, (c) indicating the registration notification completion in case that there is an answering message about the registration cancellation(RC) from the VLR1 in answering waiting state of step (b), and then processing about the answering message received from the VLR1, and (d) not clearing a subscriber location information of database even though a routing request(RR) error about a location request is created and maintaining the information in a previous VLR, in case that there is a location request of the MS from an MSC, in which a call is created about the MS in the waiting state of a registration cancellation return result (RCRR) of step N.

11. Method for managing subscriber location information in mobile communications system according to claim 10, wherein in step (a), the state during registration is indicated using a registration notification pending flag(RNPF) bit value which is set in a HLR database.

12. Method for managing subscriber location information in a mobile communications system according to claim 10, wherein in step (c), the registration notification completion state of the HLR is indicated using a registration notification pending flag(RNPF) bit value which is set in the HLR database.

13. Method for managing a subscriber location information in a mobile communications system according to claim 10, wherein step (a) further comprises the substeps of:

confirming a registration notification pending flag(RNPF) bit value of the MS before the registration notification procedure of the MS, to which the registration notification(RN) is requested, is carried out, p1 rechecking the latest set registration time of the MS in case that the bit value indicates that the registration notification(RN) is carried out after confirming the flag, and changing the flag to the bit value of the registration notification completion state by determining that the registration notification pending flag(RNPF) is set incorrectly caused by an error, in case that the registration time is passed over a predetermined time, after checking the time and then returning to the normal registration notification procedure step.

14. Method for managing subscriber location information in a mobile communications system according to claim 10, wherein step (b) further comprises the substeps of:

determining whether a VLR2 requests a second registration notification(RN) of the same MS in the state of the registration cancellation return result(RCRR) waiting state of the MS, checking a registration notification pending flag(RNPF) bit value in case that there is a second registration notification invoke(RNI) after the determination, processing the registration notification(RN) as an error when the registration notification pending flag(RNPF) bit value is set after checking.

15. Method for managing subscriber location information in a mobile communications system according to claim 10, wherein step (c) further comprises the substep of:

restoring a subscriber record of the MS, stored in the HLR database, to the VLR1 in case that a registration cancellation return result(RCRR) message of the MS is answered from the VLR1.

16. Method for managing subscriber location information in a mobile communications system according to claim 10, wherein step (d) in the waiting state of a registration cancellation return result(RCRR) of the MS, further comprises the substeps of:

determining whether there is a location request of the MS from a mobile switching center(MSC) in which a call is created about the MS, requesting a routing request(RR) of a corresponding MS to the VLR2 in case that there is a location request from the MSC after determination, checking a registration notification pending flag(RNPF) in case that the routing request return result(RRRR) errors, and maintaining a subscriber record of the MS stored in the database, in the VLR1 in case of indicating that the registration notification pending flag(RNPF) is registering the location.

17. Method for managing subscriber location information in a mobile communication system according to claim 13, wherein a latest set registration time indication method uses a latest registration time indication value established in the HLR database.

18. Method for managing subscriber location information in a mobile communications system, comprising processes of:

carrying out a corresponding registration notification (RN) of a MS in a HLR and indicating that the registration notification (RN) is processing in a corresponding VLR when the MS moves to a new serving area, preventing multi-location registration about a same subscriber during the RN until a previous registration notification (RN) is completed.

19. Method for managing subscriber location information in a mobile communications system, wherein the process of preventing multi-location registration comprises the steps of:

(a) carrying out registration notification (RN) of a corresponding MS in a HLR and indicating, at one of the group consisting of the HLR and a visitor location register (VLR), that the registration notification (RN) is processing in a VLR, (b) requesting a registration cancellation (RC) of the MS from a first visitor location register (hereinafter, a VLR1) which is in a previous serving area and waiting for answering message from the VLR1, and (c) indicating the registration notification completion in the VLR in case that there is an answering message about a registration cancellation return result (RCRR) from the VLR1 in answering waiting state of step (b), and then processing about the answering message received from the VLR1.

20. Method for managing subscriber location information in mobile communications system according to claim 19, wherein in step (a), the state for the RN of the VLR is indicated using a registration notification pending flag (RNPF) bit value which is set in a VLR database.

21. Method for managing subscriber location information in a mobile communications system according to claim 19, wherein in step (c), the registration notification(RN) completion state of the VLR is indicated using a registration notification pending flag(RNPF) bit value which is set in the VLR database.

22. Method for managing a subscriber location information in a mobile communications system according to claim 19, wherein step (a) further comprises the substeps of:

confirming a registration notification pending flag(RNPF) bit value of the MS before the registration notification procedure of the MS, to which the registration notification(RN) is requested, is carried out, rechecking a latest set registration time of the MS in case that the bit value indicates that the registration notification(RN) is carried out after confirming the flag, changing the flag to the bit value of the registration notification completion state by determining that the registration notification pending flag(RNPF) is set incorrectly caused by an error, in case that the registration time is passed over a predetermined time, after checking the time and then returning to the normal registration notification procedure step.

23. Method for managing subscriber location information in a mobile communications system according to claim 19, wherein step (b) further comprises the substeps of:

determining whether the a second registration notification (RN) of the same MS is requested in case that a routing request(RR) message of the MS is transmitted from the HLR in the state of the registration cancellation return result(CRR) waiting state of the MS, checking a registration notification pending flag(RNPF) bit value in case that there is the second registration notification(RN) after the determination, processing the registration notification(RN) as an error when the registration notification pending flag(RNPF) bit value is set after checking.

24. Method for managing subscriber location information in a mobile communications system according to claim 19, wherein step (c) further comprises the substep of:

restoring a subscriber record of the MS, stored in the HLR database, to the VLR1 in case that a registration cancellation return result(RCRR) message of the MS is answered from the VLR1.

25. Method for managing subscriber location information in a mobile communications system according to claim 22, wherein a latest set registration time indication method uses a latest registration time indication value established in the VLR database.

26. Method for managing subscriber location information in a mobile communications system, comprising processes of:

carrying out a corresponding registration notification (RN) of a MS in a HLR and indicating that the registration notification (RN) is processing in a VLR when the MS moves to a new serving area, ignoring multi-location registration signals about a same subscriber and a call processing signal from an exchange during the RN until a previous registration notification (RN) is completed.

27. Method for managing subscriber location information in a mobile communications system, wherein the process of ignoring multi-location registration signals and a call processing signal comprises the steps of:

(a) carrying out registration notification(RN) of a corresponding MS and indicating that the registration notification(RN) is processing in the VLR, (b) requesting a registration cancellation(RC) of the MS from a VLR1 which is in a previous serving area and waiting for answering message from the VLR1, (c) indicating the registration notification completion in case that there is an answering message about a registration cancellation return result(RCRR) from the VLR1 in answering waiting state of step (b), and then processing about the answering message received from the VLR1, and (d) not clearing a subscriber location information of database even though a routing request(RR) error about the location request is created and maintaining the information in the VLR1, in case that there is a location request of the MS from a MSC in which a call is created about the MS in the waiting state of the registration cancellation return result(RCRR) of step (b).

28. Method for managing subscriber location information in mobile communications system according to claim 27, wherein in step (a), the state for the RN of the VLR is indicated using a registration notification pending flag (RNPF) bit value which is set in a VLR database.

29. Method for managing subscriber location information in a mobile communications system according to claim 27, wherein in step (c), the registration notification(RN) completion state of the VLR is indicated using a registration notification pending flag(RNPF) bit value which is set in the VLR database.

30. Method for managing a subscriber location information in a mobile communications system according to claim 27, wherein step (a) further comprises the substeps of:

confirming a registration notification pending flag(RNPF) bit value of the MS before the registration notification (RN) procedure of the MS, to which the registration notification(RN) is requested, is carried out, and rechecking a latest set registration time of the MS in case that the bit value indicates that the registration notification(RN) is carried out after confirming the flag, changing the flag to the bit value of the registration notification completion state by determining that the registration notification pending flag(RNPF) is set incorrectly caused by an error, in case that the registration time is passed over a predetermined time, after checking the time and then returning to the registration notification(RN) procedure step.

31. Method for managing subscriber location information in a mobile communications system according to claim 27, wherein step (b) further comprises the substeps of:

determining whether a second registration notification (RN) of the same MS is requested in case that a routing request(RR) message of the MS is transmitted from the HLR in the state of the registration cancellation return invoke(RNI) waiting state of the MS, checking a registration notification pending flag(RNPF) bit value in case that there is a second registration notification request(RNR) after the determination, processing the registration notification(RN) as an error when the registration notification pending flag(RNPF) bit value is set after checking.

32. Method for managing subscriber location information in a mobile communications system according to claim 27, wherein step (c) further comprises the substep of:

restoring a subscriber record of the MS, stored in the HLR database, to the VLR1 in case that a registration cancellation return result(RCRR) message of the MS is answered from the VLR1.

33. Method for managing subscriber location information in a mobile communications system according to claim 27, wherein step (d) in the waiting state of a registration cancellation return result(RCRR) of the MS, further comprises the substeps of:

determining whether there is the location request of the MS from a mobile switching center(MSC) in which a call is created about the MS, requesting the routing request(RR) of a corresponding MS to the VLR1 in case that there is the location request from the MSC after determination, checking a registration notification pending flag(RNPF) in case that a routing request return result(RRRR) errors, maintaining a subscriber record of the MS stored in the database, in the VLR1 in case of indicating that the registration notification pending flag(RNPF) is registering the location.

34. Method for managing subscriber location information in a mobile communications system according to claim 30, wherein a latest set registration time indication method uses a latest registration time indication value established in the VLR database.

* * * * *